Dec. 30, 1969  J. W. GRAY  3,486,215
TOOL FOR ASSEMBLING PIPE SECTIONS
Original Filed Aug. 30, 1966  3 Sheets-Sheet 2

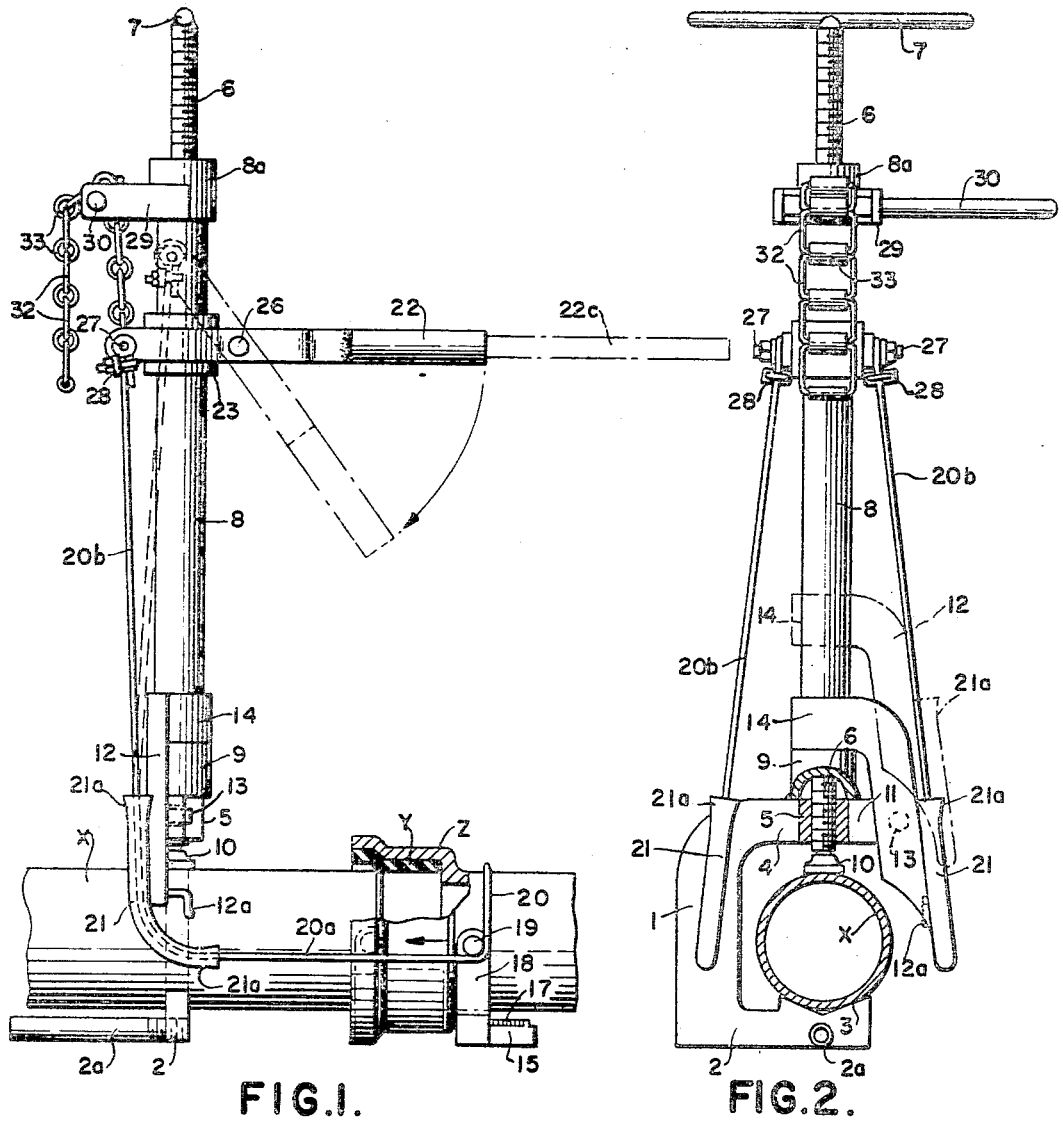
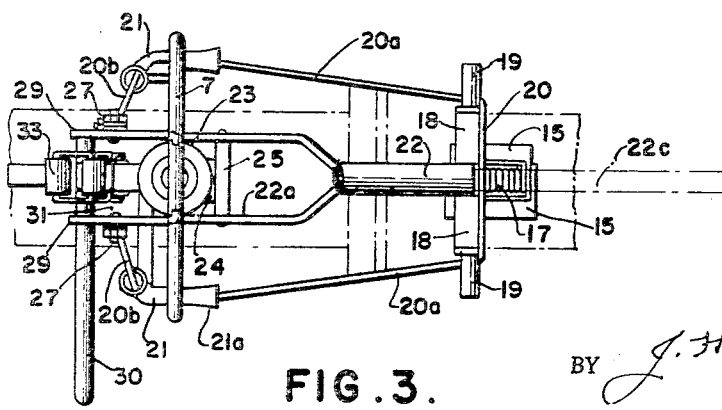

INVENTOR
James W. Gray

BY J. Hanson Boyden,

ATTORNEY

Dec. 30, 1969   J. W. GRAY   3,486,215
TOOL FOR ASSEMBLING PIPE SECTIONS
Original Filed Aug. 30, 1966   3 Sheets-Sheet 3
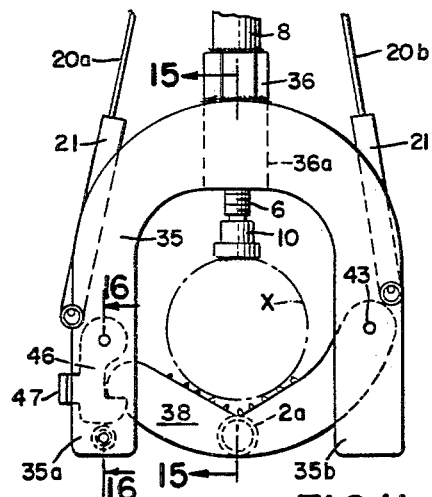
FIG.11.
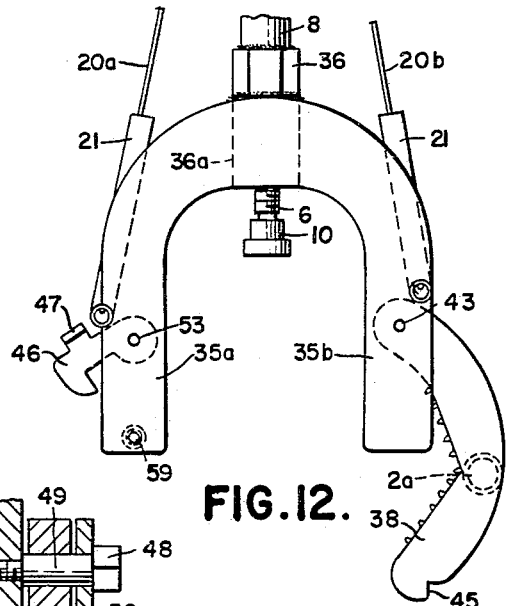
FIG.12.
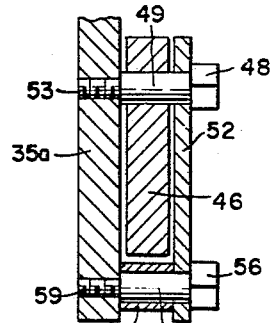
FIG.16.
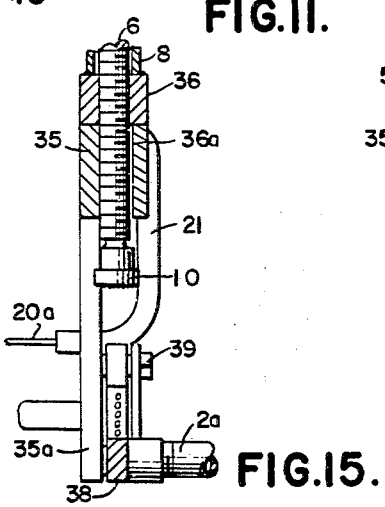
FIG.15.
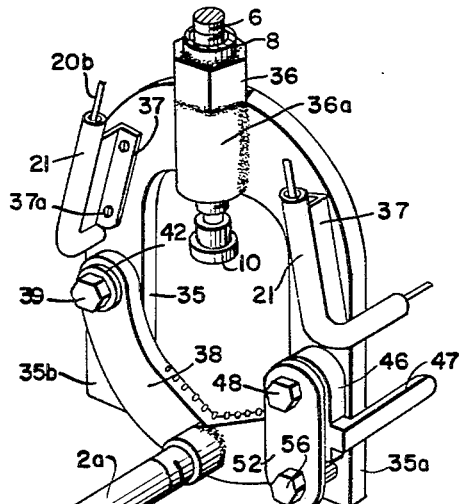
FIG.13.
FIG.14.
INVENTOR
James W. Gray
BY J. Hanson Boyden
ATTORNEY

United States Patent Office 3,486,215
Patented Dec. 30, 1969

3,486,215
TOOL FOR ASSEMBLING PIPE SECTIONS
James W. Gray, 1038-A N. Euclid Ave.,
Tucson, Ariz. 85719
Continuation of application Ser. No. 576,080, Aug. 30, 1966. This application July 1, 1968, Ser. No. 752,425
Int. Cl. B23p *19/04*
U.S. Cl. 29—237                              4 Claims

ABSTRACT OF THE DISCLOSURE

A pipe assembling tool especially useful for bell and spigot pipe in which a first member is rigidly clamped to the spigot and of one pipe and a U-shaped member encircles part of the bell end of a second pipe. A cable extends between the two members and is looped around outwardly extending ears on the U-shaped member. The clamping member supports a post which carries a slidable collar and a lever pivotally movable in the vertical plane. One end of the lever holds the ends of the cable so that movement of the lever shortens the parts of the cable between the two members, forcing the pipe ends together.

---

This application is a continuation of Ser. No. 576,080, filed Aug. 30, 1966 and now abandoned.

This invention relates to plumbing tools, and more particularly to a tool for assembling sections of "bell and spigot" type pipe and fittings.

A method heretofore commonly used for forming joints between sections of pipe of this kind, and between a section of pipe and a fitting, is as follows. The end of the pipe section was inserted losely into the "bell" of another section or fitting, and the annular space between then packed with a loose, compressible material such as "cakum," which was then "caulked" or rammed down tightly to form a compact mass partially filling the annular space. Melted lead was then poured in on top of this mass, so as to substantially fill the rest of the annular space.

This method was tedious and troublesome, and, moreover, if the pipe joint happened to be in a horizontal position, it was very difficult to pour the lead in.

More recently, the oakum and lead method has been superceded by the use of a sealing ring or cylindrical gasket of neoprene or similar material, adapted to be inserted in the annular space between the "bell" and "spigot." Great difficulty in practice however, has been encountered in assembling the parts of the joint, i.e., in placing the pipe end in the ring and inserting the ring in the "bell" of the other pipe section or fitting.

The general object of the invention, therefore, is to devise equipment in the nature of a portable tool by the use of which a plumber may easily and rapidly assemble the "spigot" end of one pipe or fitting in the "bell" end of another pipe or fitting, with the sealing ring or gasket between the bell and spigot.

Pipe of the character referred to, commonly known as "soil pipe," is usually made of cast iron, and is produced in different standard sizes, such as 2-inch, 3-inch or 4-inch size.

Another object of the invention is to provide a tool for assembling pipe and fittings of this kind, which can be used for handling pipe of any of these different sizes without the use of substitute parts and without changing the tool in any way.

A still further object is to devise a tool of this nature so constructed that it may be applied to or removed from the pipe by transverse movement, substantially at right angles to the length of pipe.

With the above and other objects in view, and to improve generally on the details of such equipment, the invention consists of the construction and arrangement of parts hereinafter described and claimed and illustrated in the accompanying drawings, forming part of this specification, and in which:

FIG. 1 is a side elevation of one form of the improved tool, showing it applied to two pieces of pipe to be coupled;

FIG. 2 is an end elevation of the same, showing one of the pieces of pipe in section;

FIG. 3 is a plan view of the same;

FIG. 4 is a sectional view on an enlarged scale of the swivel block hereinafter referred to;

FIG. 11 is an elevational view, similar to the lower part of FIG. 2, of what I shall call the front side of a modified construction of pipe clamping means, the clamping means being shown in closed position;

FIG. 12 is a similar view, but showing the clamping means in open position;

FIG. 13 is a perspective view of the rear or back side of the clamp illustrated in FIGS. 11 and 12, the clamping means being shown in closed position;

FIG. 14 is an "exploded" view of the clamping means looking from the same direction as in FIG. 13;

FIG. 15 is a vertical, transverse section substantially on the line 15—15 of FIG. 11, looking in the direction of the arrows; and FIG. 16 is a fragmentary vertical section on an enlarged scale, substantially on the line 16—16 of FIG. 11, looking in the direction of the arrows.

Figure 5:
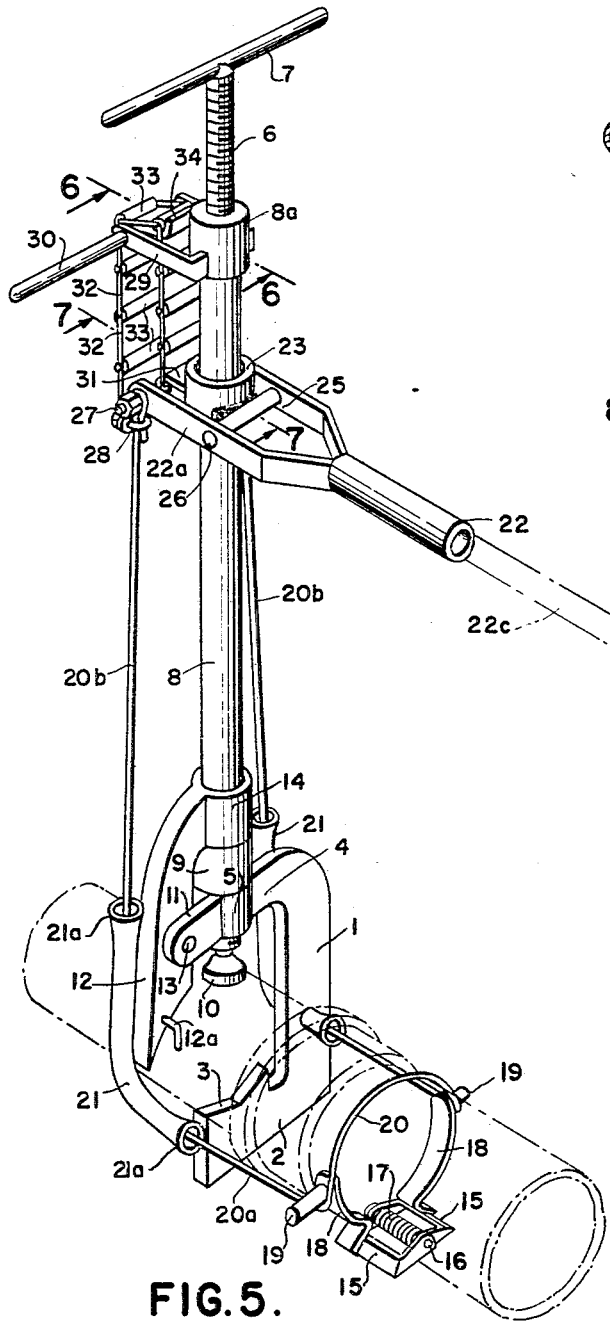
FIG. 5 is a perspective view of the tool illustrated in FIGS. 1, 2 and 3.

Where, in the following specifications and claims, I refer to "pipe sections" or "pieces of pipe," it will be understood that I intend to include pipe fittings, such as elbow, T's or Y's, as well as straight pipe.

Referring to the drawings in detail, in FIG. 1 I have shown the spigot end X of one piece of pipe to be coupled to the bell Z of a second piece of pipe by means of the sealing ring or gasket Y.

One form of the improved tool, as shown in FIGS 2 and 5, comprises a base or frame made up of a vertical portion 1 and a pair of horizontal portions 2 and 4, rigidly connected with the vertical portion, after the manner of a "C-clamp."

The lower horizontal number 2, which is adapted to rest on the ground, has at its upper side a V-notch 3, adapted to support the pipe X. (See FIG. 2.)

A foot 2*a*, in the nature of a short piece of pipe, is set horizontally into the base member 2, to lend stability to the tool. It is threaded into the member 2, so that it may be removed when desired.

Welded to the end of the upper horizontal portion 4 is a nut 5 through which operates a threaded shaft 6, having at its upper end a handle 7, by which it may be turned. A hollow post or column 8 surrounds the screw shaft 6, and is spaced from it at its upper end by a special fitting 8*a*, through which the shaft freely passes.

This post is welded at its lower end to a specing sleeve 9, which in turn, is welded to the nut 5. Swiveled to the lower end of the screw shaft 6 is a block 10. When the shaft is screwed down through the nut 5, it is obvious that the block 10 will engage the pipe X, and grip it firmly between itself and the V-notch 3. The surfaces of both the V-notch and block are preferably covered with carbide particles, or the like, to prevent slipping.

One way of swiveling the block on the end of the screw shaft is shown in FIG. 4. A ball 6a is formed at the end of the shaft 6, connected with the shaft by means of a neck, and a hole with a rounded bottom is formed in the swivel block 10. The ball is formed in the swivel block 10. The ball is inserted in this hole and then the upper edges of the hole swaged over around the neck, so as to enclose the ball, all in a well known manner.

A horizontally extending arm 11 is welded to the side of the nut 5 opposite the portion 4 of the clamp, and is disposed in line therewith. A jaw 12, removably attached to the arm 11 extends down alongside the pipe X, as best shown in FIGS. 2 and 5, so as to confine the pipe between itself and the vertical portion 1 of the clamp. A convenient method of attaching this jaw 13 to the arm 11 is by means of a bolt or pin 13, permanently secured to the arm 12 and fitting loosely in an enlarged hole in the arm 11. The jaw 12 has a sleeve 14 rotatable and slidable on the post 8.

When it is desired to insert a piece of pipe into the tool, the jaw 12 is swung slightly about the post 8 to disengage the pin from the hole, the jaw 12 being lifted to some such position as indicated in dotted lines in FIG. 2. A hook 12a projects from the jaw 12 in some such position as shown in FIGS. 1 and 5, and when the jaw is lifted as described, this hook is adapted to engage over the upper edge of arm 11, and thus hold the jaw 12 in elevated position. When the jaw is in the elevated position shown in dotted lines, the side of the clamp is completely open, and the tool may be slipped over the pipe or the pipe placed in position in the tool by a transverse or at substantial right angles to the length of the pipe. Otherwise, the tool may be slipped over the end of the pipe by relative longitudinal movement. It will be noted that the parts 1, 2, 4, 5 and 11 of the base constitute in effect a generally horseshoe shaped frame, opening laterally.

A device which I shall call a "cable anchor" rests on the ground adjacent the above described clamping device, beneath the end of the other piece of pipe to be coupled. As shown in FIGS. 1, 3 and 5, this cable anchor comprises a pair of members 15 hingedly connected by a pivot pin 16, with which is associated a coil spring 17. In short, this part of the device is similar to the well known "screen door hinge" which is in common use.

To each member 15 is welded one end of a semi-rigid arm 18, curved so as to embrace the pipe, and at the other end each arm carries a radially projecting cable guide 19. This may conveniently consist of a short section of small pipe, welded to the arm. As will be seen, these arms 18 partially encircle the lower side of the second pipe to be coupled, immediately adjacent the bell Z, as shown in FIG. 1. The extent of the encirclement depends on the size of the pipe. If working with 2" pipe, the arms will extend further around the pipe than when working with 4" or 6" pipe. An important feature of the invention is the fact that the same cable anchor may be employed for any of these three standard sizes of pipe.

A cable, preferably of steel, is employed in connection with the cable anchor. This cable is looped partially around the upper side of the pipe, as shown at 20 in FIGS. 1 and 5, and then passes under the guide elements 19, and extends at each side horizontally toward the clamping device, as indicated at 20a.

Figure 6:
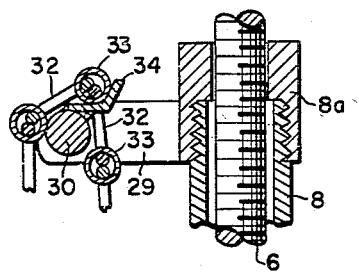
FIG. 6 is a fragmentary vertical section on an enlarged scale, substantially on the line 6—6 of FIG. 5, looking in the direction of the arrows.

Means are provided at the clamping device for changing the direction of the cable from horizontal to vertical. This might be a pair of pulleys, but preferably comprises a pair of curved, tubular cable guides 21. One of these passes through and is carried by the base 1, as shown in FIGS. 2 and 5, while the other is secured, as by welding, to the jaw 12. These guides 21 are so shaped that the cable emerges from their upper ends in a direction substantially parallel with the post 8, as shown at 20b, in FIGS. 1 and 6. The outer ends of these guides 21 are preferably flared as indicated at 21a, to reduce wear on the cables.

Figure 8:
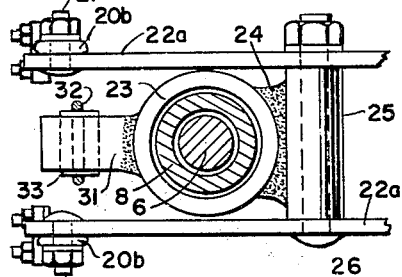
FIG. 8 is a fragmentary plan view, on the same scale as FIGS. 6 and 7, showing parts illustrated in FIG. 7, some of these parts being shown in section.

A sleeve 23 is constructed to slide freely on this post, and an operating lever 22 is pivotally mounted on this sleeve. One method of mounting is to secure to the sleeve, as by welding 24 (see FIG. 8) a tube 25. The lever 22 has a bifurcated end or yoke 22a welded thereto, which straddles the sleeve 23 and tube 25, and a pivot pin 26 passes through the tube 25 and end portions 22a of the yoke. This pivot divides the lever into a long and a pair of short arms.

Figure 7:
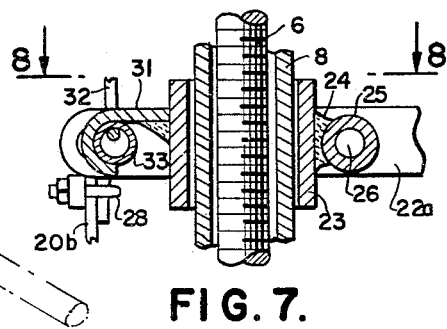
FIG. 7 is a fragmentary vertical section on an enlarged scale, substantially on the line 7—7 of FIG. 5, looking in the direction of the arrows.

Secured to the ends of these short arms 22a as by means of ordinary bolts 27, and U-bolts 28 (see FIGS. 7 and 8) are the free ends of the vertical portions 20b of the cable.

Figure 10:
FIG. 10 is a detailed view, in longitudinal section, of the operating lever which I prefer to employ.

As shown in FIG. 10, the operating lever 22 preferably is in the nature of a special tubular socket, having a threaded inner end 22b. This member may, for example, have a length on the order of six inches, and is for use in cramped places, as under floors, where it may be operated by foot power, if necessary. In other places, as for example, in open trench work, it is usually desired to use a longer handle to provide more leverage. In that case, I insert into the socket member 22, a piece of pipe 22c threaded at its end, as shown in FIG. 10, which piece may be on the order of 24" to 30" long. In FIGS. 1 and 5, this extension handle 22c is shown in broken lines.

Means must, of course, be provided for adjustably holding the sleeve 23 against downward movement, so that it can support the lever and cable. One way of doing this is illustrated in FIGS. 1, 5, 6 and 7. In these figures, I provide a bracket 29, with two spaced, parallel arms, secured to a ring 8a at the top of the post 8, and projecting horizontally in a direction opposite that of the lever 22. A handle 30 passes through the two arms of the bracket, and extends laterally thereof to provide means for holding the post 8 while the screw shaft 6 is turned.

I utilize a flat chain made up of rectangular links 32 united by short tubular members 33. This chain is located between the arms of the bracket 29, and passes freely around the handle 30. One end hangs free, as shown in FIG. 1, while the other end is engaged over a hook 31, carried by the sleeve 23. (See FIGS. 7 and 8.)

A second hook or catch 34 (FIG. 6) is welded to the handle 30 between the arms of the bracket 29, so as to engage any desired link of the chain.

It will thus be seen that the handle 22 and sleeve 23 may be moved upwardly on the post as necessary to take up the slack in the cable, the chain being fed by hand up and over the handle 30 and hook 34, and the proper link engaged with the hook. When the lever 22 is depressed, tension will be applied to the ends 20b of the cable, and this, in turn, acting through the portions 20a and loop 20 of the cable, will pull the bell Z of the second pipe section toward the spigot end of the first piece of pipe which is firmly gripped between the swiveled block 10 and V-notch 3 of the clamping device. Meanwhile, the gasket Y is placed in position inside the bell Z, and the spigot end of the gripped pipe, having first been lubricated by soap or the like, is forced into the annular gasket, due to the other piece of pipe or fitting being pulled toward the first piece of pipe by the action of the lever on the cables.

If a single actuation of the lever is not sufficient to complete the coupling, the sleeve 23 and lever may be raised, another link engaged over the hook 34, and the lever again depressed, and this operation may be repeated as often as necessary.

Figure 9:
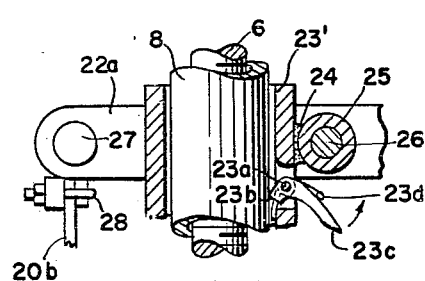
FIG. 9 is a vertical section, similar to FIG. 7, but showing a modified construction of means for adjusting the vertical position of the operating lever, parts being shown in elevation.

In FIG. 9, I have illustrated a modified construction. Instead of the chain and associated parts, I have shown in this figure a slidable sleeve 23' adapted to be frictionally locked against downward movement by a pivoted dog 23a, having a sharp nose 23b caused to bite into the post by a spring 23d and also having a tail 23c. It will be obvious that this sleeve may be lifted vertically as desired, and will be held in adjusted position by the dog, which may be released by swinging the tail upwardly.

Other means, such for example as the familiar toothed rack, used in automobile bumper jacks, may also be employed to adjust the vertical position of the sleeve and operating lever, as will be obvious.

Referring now to FIGS. 11 to 16, inclusive, I have illustrated a modified construction of clamping device.

While in FIGS. 1, 2 and 5, I have shown a generally horseshoe-shaped frame 1, opening laterally at the side, in FIGS. 11 to 16, I have shown a horseshoe-shaped frame 35, opening vertically at the bottom. A guide sleeve 36a flattened on one side, is welded to the top of the frame, and a nut 36 is welded to the top of this sleeve. The threaded shaft 6 works through this nut and the lower end of the post 8 may be secured to this nut either by threading or welding.

Another difference is that whereas, in FIGS. 1 and 2, the cable guides 21 are shown as fixedly secured to the frame, in FIGS. 11 to 14, they are secured as by welding to angle brackets 37 which are removably mounted on the frame as by means of screws or bolts 37a.

The lower open end or bottom of the horseshoe-shaped frame 35 is closed by a flattened V-shaped clamping bar 38 which bridges the space between the arms 35a and 35b of the frame. This bar, which carries the foot 2a, is pivotally attached at one end to the rear face of the arm 35b by means of a bolt 39. As best shown in FIG. 14, this bolt has a smooth cylindrical portion 40, and a reduced threaded end portion 43, separated from the cylindrical portion by a shoulder.

The bar 38 has at its end an opening 41, of a size to snugly receive the cylindrical portion of the bolt, and a washer 42 encircles this cylindrical portion and is interposed between the head of the bolt and the bar 38. The arm 35b of the frame is provided with a threaded opening 44, of a size to receive the threaded end 43 of the bolt. In assembling, the bolt is passed through the washer 42 and opening 41 in the bar 38 and its threaded end inserted in opening 44, and screwed up tight against the above mentioned shoulder. This shoulder is so located with respect to the length of the bolt and the combined thickness of the washer and bar 38 that, when the bolt is screwed up tight as described, the shoulder engages the surface of the arm 35b and acts as a stop to insure that the bar has enough clearance to enable it to pivot freely.

At its other end, the bar 38 is formed with a notch 45, adapted to be engaged by a hook 46, pivotally carried by the other arm 35a of the frame. This hook has an operating handle 47, by means of which it may be swung on its pivot. The hook is pivotally supported by a bolt 48, having a cylindrical portion 49 adapted to pass through an opening 50 formed in the hook. This cylindrical portion also passes through an opening 51 in the upper end of a vertically disposed retainer plate 52. This retainer plate has another opening 55 at its lower end, through which opening, and through a spacer sleeve 58, passes a similar bolt 56, having cylindrical portion 57. The bolts 48 and 56 both have reduced, threaded end portions 53 and 59, respectively (see FIG. 16) which threaded portions are received in threaded openings 54 and 60 formed in the arm 35a. These bolts, like the bolt 39, have shoulders separating the cylindrical portions from the threaded portions, and these shoulders abut the surface of arm 35a when the bolts are screwed up. Thus, by virtue of these shoulders and the spacer sleeve 58, there is provided a space between the retainer plate 52 and the arm 35a slightly wider than the thickness of the hook 46, in which space the hook may freely swing.

Normally, when in operative position, the clamping bar 38 bridges the space between the arms of the frame, supported by the hook 46, completely enclosing the pipe X being assembled, as shown in FIG. 11. When, however, it is desired to remove the tool from the pipe, the hook is moved about its pivot and disengaged from the clamping bar 38, thus permitting the clamping bar to be swung to inoperative position as shown in FIG. 12, in which position the space between the arms of the frame is free and unobstructed, and the tool may be lifted off of the pipe by a vertical movement at right angles to the pipe.

This is particularly advantageous when laying pipe in a horizontal, open ditch, where removal of the tool laterally would be difficult.

What is claimed is:

1. A pipe tool for assembling "bell and spigot" pipe comprising the combination of
   a clamping device for rigidly gripping a first section of pipe at a fixed point during the entire assembling operation;
   a cable anchor including
   a pair of hingedly connected arms having free ends adapted to partially encircle one side of a second section of pipe,
   spring means for resiliently urging the free ends of said arms toward each other whereby said arms can effectively embrace pipes of various sizes, and
   a radially projecting cable guiding element carried by each arm;
   a cable looped partially around the other side of the pipe and passing around said cable guiding elements, and extending to said clamping device; and
   means for exerting a pull on the portions of said cable which extend beyond said cable guiding elements.

2. A pipe tool for assembling first and second sections of "bell and spigot" pipe of the type wherein the second section has an integrally formed bell at one end and a cylindrical gasket within the bell, the tool comprising the combination of
   a rigid clamping device for engaging the first section at a fixed point;
   means for engaging the second section of pipe comprising
   a cable looped partially around the second section of pipe immediately behind the bell, the cable having free ends, and
   means partially encircling the second section of pipe for preventing the cable loop from slipping off;
   manually operable means mounted on said clamping device for exerting tension on said cable in a direction to pull the two sections toward each other and to pull the two sections toward each other and to cause the spigot end of the first section to enter the cylindrical gasket held within the bell of the second section,
   said manually operable means comprising
      a post rigidly fixed to and extending upwardly from said clamping device,
      a sleeve slidable on said post,
      a manually operable lever pivotally attached to said sleeve, the free ends of said cable being connected to one extreme end of said lever, and
      means for holding said sleeve against downward movement.

3. Apparatus according to claim 2 wherein
   said means for holding said sleeve against downward movement comprises
   a latch member mounted on the upper end of said post
   a chain having one end attached to said sleeve,
      said chain having a plurality of links dimensioned to be attachable to said latch member to establish a plurality of operating positions for said sleeve on said post.

4. A tool for axially assembling pipe sections to form a pipe joint wherein one end of a first section of pipe is inserted into an enlarged end of a second section of pipe with a tightly fitting gasket between the sections at the joint, the tool comprising the combination of a first member attached to the first section of pipe;
a second member coupled to the second section of pipe;
a cable extending between and attached to first and second members;
pulling means mounted on one of said first and second members for exerting a tensile force on said cable to urge said pipe sections together, said pulling means comprising
a post rigidly attached to said one of said members and extending radially outwardly therefrom relative to the pipe section,
a sleeve slidable on said post;
a lever pivotally mounted on said sleeve,
adjustable means for fixing the position of said sleeve against motion on said post toward the pipe section,
said cable being attached to one end of said lever, the other end of said lever being manually operable to exert tensile force on said cable, and
guide means mounted on said one of said members for changing the direction of said cable.

References Cited

UNITED STATES PATENTS

| | | | |
|---|---|---|---|
| 2,399,213 | 4/1946 | Augustine | 29—237 |
| 2,569,978 | 10/1951 | Dunlap | 254— 29 X |
| 2,793,424 | 5/1957 | Witte | 29—237 |
| 3,096,572 | 7/1963 | Simmons | 29—237 |

ROBERT C. RIORDON, Primary Examiner

J. C. PETERS, Assistant Examiner